United States Patent [19]

McCabe, Jr.

[11] Patent Number: 4,549,477
[45] Date of Patent: Oct. 29, 1985

[54] OZONE TREATMENT SYSTEM FOR FOOD

[76] Inventor: Barkman C. McCabe, Jr., P.O. Box 26, Holtville, Calif. 92250

[21] Appl. No.: 648,501

[22] Filed: Sep. 10, 1984

[51] Int. Cl.[4] .............................................. A23B 7/14
[52] U.S. Cl. ...................................... 99/477; 99/485
[58] Field of Search .................. 99/467, 477, 478, 480, 99/468, 469, 473, 474, 323.1, 323.2, 485; 426/312, 319, 320

[56] References Cited

U.S. PATENT DOCUMENTS

| | | | |
|---|---|---|---|
| 2,015,388 | 9/1935 | Thomas | 99/477 |
| 3,487,769 | 1/1970 | Dixon | 99/468 |
| 3,931,759 | 1/1976 | Hayashi | 99/468 |
| 4,096,793 | 6/1978 | Wachter | 99/467 |
| 4,161,139 | 7/1979 | Deuren | 99/467 |

*Primary Examiner*—Robert W. Jenkins
*Attorney, Agent, or Firm*—Albert L. Gabriel

[57] ABSTRACT

Continuous process apparatus and method for treating food products with ozone gas, primarily for sterilization. The food products, which may be delicate vegetable products such as potato chips, dehydrated onions and other dehydrated vegetables, are continuously conveyed through a treatment zone filled with ozone, and oxygen that is a by-product of the ozone treatment, and also air unavoidably entering the treatment zone with the food products, are gravity separated from the ozone in a separation zone located above the treatment zone.

18 Claims, 12 Drawing Figures

OZONE TREATMENT SYSTEM FOR FOOD

BACKGROUND OF THE INVENTION

1. Field of the Invention

The present invention is in the field of apparatus and methods for treating food products with ozone, primarily for the purpose of sterilization.

2. Description of the Prior Art

Ozone gas ($O_3$) is a very strong oxidizing agent, having an oxidation potential more than twice that of chlorine and approximately three times that of hydrogen peroxide. Ozone also has the advantage of breaking down upon use as an oxidant into oxygen ($O_2$), which is normally beneficial. Thus, ozone currently finds widespread usage as an oxidizing agent for bacterial, virus, and mold control for meat and fish storage, fresh fish processing for greater transportation range in the "fresh" state, meat, fish and poultry markets, produce storage, restaurants, cooliing towers, animal feed products, marine life, architectural lakes, beverage plants, swimming pools, potable water systems, and tertiary waste systems. Ozone is also currently widely used for odor control in air conditioning systems, industrial plants, restaurants, mortuaries, rest homes, pet shops, animal hospitals, restrooms, and hotels. Applicant is aware of a current use of ozone to extend the period of time that fresh fish will remain sufficiently fresh for marketing, which has recently enabled Alaskan fish to be shipped to the 48 contiguous states and distributed therein as "fresh" fish.

While the use of ozone in connection with food products is primarily for sterilization, it is also useful for preservation of some food products. For example, the treatment of raw onions with ozone will inhibit the growth of green sprouts. Also, ozone treatment will retard the ripening of bananas.

All current usages of ozone for the sterilization or preservation of food products of which applicant is aware are strictly on a "batch" basis, where the food is placed in a container, which may be a room, and the container is flooded with ozone for an appropriate period of time. Such batch treatment of food products with ozone is not practical for high production items, and it is also very wasteful of ozone because all or most of the ozone used for a particular batch is lost when the room or other container is opened and a treated batch is removed and replaced by an untreated batch.

Because of these problems with the batch ozone treatment of food products, there has long been a need in the art for a continuous process system for treating food products capable of processing the food products at a high production rate while at the same time preserving in the system all or most of the ozone that has not broken down to oxygen. While there is some prior patent art disclosing continuous process ozone food treatment systems, these have had the serious deficiencies of (1) applying the ozone in such a highly diluted state that the treatment could not be fully effective, (2) not being capable of containing and preserving the unreacted ozone, and therefore requiring use of an undesirably large amount of ozone for the amount of sterilization accomplished, or (3) transported or otherwise handled the food products in such a way that only such durable food products as grains could be processed, and fragile food products such as potato chips, dehydrated onions and other vegetables, leafy-type vegetables, and fragile fruits such as grapes, could not possibly be processed without severe damage.

Referring to the prior patent art, a batch food treatment system is seen in U.S. Pat. No. 680,630 to Williams et al., which disclosed ozone treatment of fish on a batch basis. The system of this disclosure not only had the disadvantages inherent in a batch system of ozone loss when the storage house was opened for removal and replacement of treated products and limited production capability, but also this patent taught that only a small portion of the flow of air to the treatment house was to be ozone, and the ozone that was used was already only a small fraction of the air from which it was prepared because it was prepared by means of an electric discharge.

Typical of the prior art patent disclosures of continuous process systems for treating food products with ozone are the Heyde etal. U.S. Pat. No. 765,972, Wiliams Reissue U.S. Pat. No. 13,064, Eolkin U.S. Pat. No. 3,341,280, and Darrah U.S. Pat. No. 2,108,030. The Heyde et al., Williams, and Eolkin patents were all limited to the treatment of grain products, and the systems disclosed therein would have been highly damaging to fragile food products. Heyde et al. disclosed the continuous process treatment of ground wheat. Ozone was applied to the wheat in a mixer that would act like a grinder for such delicate food products as dried onions or potato chips. The ozone in Heyde et al. was produced by an electric discharge through air, so it would be only a minor fraction of air supplied to the ground wheat in the mixer. The treated product left the mixer out of a conduit in the bottom, so that ozone would be freely lost from the system by the effects of gravity. Williams disclosed the oxidizing of flour with electrolytically separated oxygen from water, so there would only be a very small percentage of ozone in this treatment. The oxidation occurred in a screw-type feeder, so the apparatus could not be used for fragile food materials. The Eolkin patent disclosed a continuous process system only applicable to fine particulate food products such as spices, the system working on a "fluidizing" principle in which the particles flowed with the ozone or other sterilizing gas. Eolkin is the only patent of which applicant is aware where there was any attempt to conserve the ozone or other sterilizing gas, but this was accomplished by utilizing auger-type feed mechanisms that were effectively plugged with the powdered food product so as to conserve the gas, and such auger-type devices would be severely damaging to delicate food products. The Darrah patent disclosed continuous processing of milk through a corona discharge that would produce ozone, but only as a minor fraction of air applied to the milk. The Darrah system was applicable only to a liquid product, and could not be used for solid food products.

Di Giacinto et al. U.S. Pat. No. 2,635,051 disclosed a conveyor system for ozone treatment of boxed mushrooms. This system was not applicable to uncontained fragile vegetables or other food products, and the boxes were conveyed in a wide open region under where the ozone was produced, so the ozone was freely lost from the system and had to be continuously replaced. The ozone was produced by radiation lamps, so it would have been only a minor fraction of air applied to the boxed mushrooms. Another problem with the Di Giacinto et al. system was that confinement of the mushrooms in the boxes would have seriously interfered with the free application of ozone to the mushrooms packed together in the boxes.

The Rivkowich U.S. Pat. No. 3,809,769 disclosed the use of hydrogen peroxide or ozone on spent tea to increase the yield in making instant tea, so this patent disclosure was for a purpose different than sterilization of food products. The Visness et al. U.S. Pat. No. 3,203,809 dealt with the smoking of meat, and utilized a corona discharge to cause uniform ionization, and hence precipitation, of the smoke. While a small fraction of ozone would be incidentally produced in the air, that would be freely lost from the system. The Rhodes U.S. Pat. No. 4,072,762 related to controlling steam during the baking of bread by use of an electrostatic field. If ozone were incidentally produced by such electrostatic field, which is questionable, it would be a very minor amount, and it would have been free to flow out of the baking oven.

SUMMARY OF THE INVENTION

In view of these and other problems in the art, it is an object of the present invention to provide a system for treating food products, and particularly dehydrated or raw vegetable products, with ozone on a continuous process basis in which a minimum amount of the ozone is lost to the atmosphere during the processing.

Another object of the invention is to provide a system for treating food products with ozone on a continuous process basis, wherein there is a minimum amount of dilution of the ozone with atmospheric air and with oxygen formed as a by-product of the sterilization action of the ozone, so that the ozone applied to the food products is at all times at a maximum concentration.

Another object of the invention is to provide continuous process apparatus and method for treating food products with ozone which, because of a high concentration of ozone in the system, is capable of processing a large amount of product in a minimum amount of time.

A further object of the invention is to provide a continuous process ozone treatment system capable of processing without damage even the most delicate of food products, such as potato chips, dehydrated onions, and other dehydrated vegetables.

According to the invention, the much higher density of ozone than air and oxygen is, for the first time, utilized in an ozone food processing system to maximize conservation of ozone in the system and at the same time maximize the concentration of ozone for greatest effectiveness in sterilizing or otherwise preserving food products bathed in the ozone.

According to the invention, food products are conveyed through an elongated housing structure filled with ozone on a series of conveyor units which move at a predetermined speed to provide the desired treatment residency time. Ozone is distributed from a suitable source, such as a pressure vessel, at spaced locations along the conveyor system so that fresh ozone will continuously displace oxygen formed as a by-product of the oxidation reaction of ozone on potentially toxic organisms on the food products. The system takes advantage of the much greater density of ozone than such oxygen by-product and also air which unavoidably enters the system with the input of food products, to minimize the escape of ozone from the system and to maximize the concentration of ozone through which the food products are conveyed. The density of ozone gas is 1.50 times that of oxygen produced as a by-product of the ozone reaction, and 1.67 times the density of air that unavoidably enters the system through the input. The food products enter the system through an input air lock, preferably of the "revolving door" type, and then through the top wall of the elongated conveyor housing, and any air entering with the food products will, because of its much lower density than ozone, float on the ozone proximate the top wall of the housing, with minimal mixing of such air with the ozone in which the food products are being treated. The top wall of the housing inclines upwardly from its input end to its output end so that such incoming air will continuously float along the top wall of the apparatus toward the output end. Similarly, oxygen produced as a by-product of the ozone treatment of the food products will float upwardly through the body of ozone because of its much lower density and will also float along the top wall of the elongated housing structure in the direction from the input end to the output end. At the output end of the housing structure, an elevator conveyor housing constituting a secondary housing structure projects substantially above the top wall of the primary housing structure, and an elevator conveyor receives the treated food products from the primary conveyor system and elevates them to a raised location above the main housing structure for discharge through an output airlock, still at an elevated location substantially above the main housing structure. The input air and by-product oxygen both accumulate in this raised secondary housing structure by floating on top of the ozone in the system, and are preferentially discharged through an outflow conduit at the top of the secondary housing and through an output airlock through which the treated food products pass.

These and other objects of the present invention will become clear in the following description as taken in conjunction with the drawings.

DETAILED DESCRIPTION

FIGS. 1-7 illustrate a first form of ozone sterilization apparatus according to the invention which is generally designated 10. The primary structural part of apparatus 10 is an elongated housing structure 12 of generally rectangular cross-section having a top wall 14, a bottom wall 16, side walls 18 and 20, and input and output end walls 22 and 24, respectively. Preferably, each of the end walls 22 and 24 has a respective access door 26 and 27 for inspection and cleaning. The output end wall 24 extends upwardly beyond the main body of the elongated housing structure 12 so as to form one of the walls of a housing 28 for an elevator conveyor. Elevator housing 28 inclines upwardly and toward the output end of apparatus 10, extending to a considerable height above the top wall 14 of housing structure 12. The incline of elevator housing 28 enables the elevator conveyor contained therein to have a corresponding incline suitable for raising sterilized food products to the elevated output of conveyor housing 28 without falling off the elevator conveyor. Thus, the elevator conveyor housing 28 consists primarily of an upwardly inclined section 30, and this terminates in a horizontal top section 32.

Figure 2:
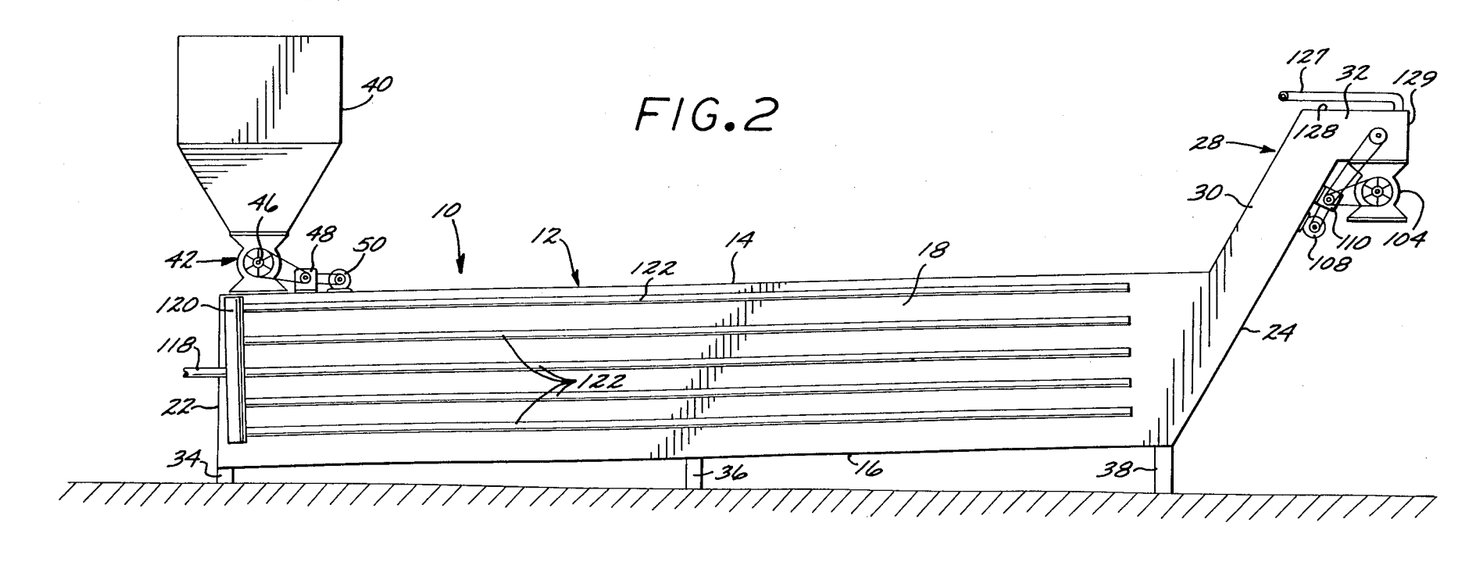
FIG. 2 is a side elevational view of the apparatus of FIG. 1.
Figure 3:
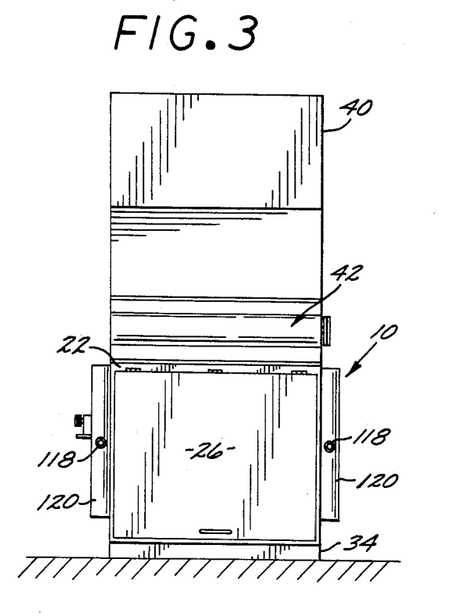
FIG. 3 is an end elevational view of the apparatus shown in FIGS. 1 and 2 showing the input end of the apparatus.
Figure 7:
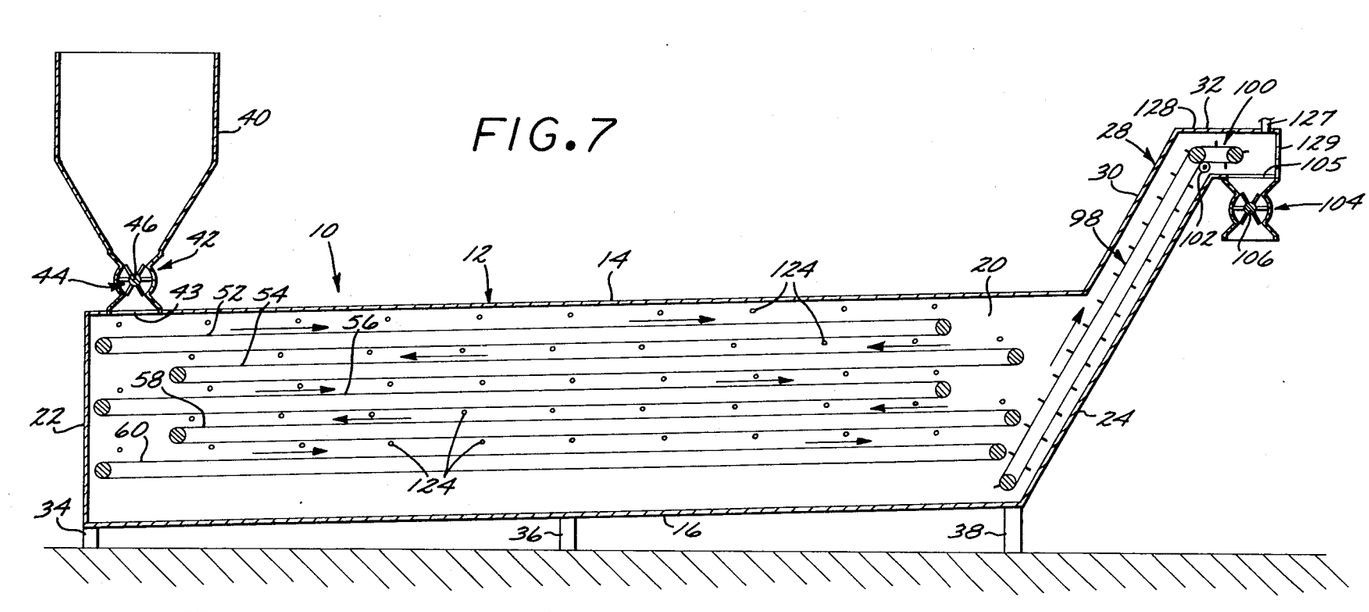
FIG. 7 is a vertical, axial section taken on the line 7—7 in FIG. 1 showing further internal details of construction.

The elongated housing structure 12 is mounted on a series of supports 34, 36 and 38 which place housing structure 12 at a slight upward incline from its input end to its output end. This is for the purpose of causing oxygen within elongated housing structure 12 to continuously flow toward the output end of the apparatus and finally to exit the apparatus from the horizontal top section 32 of elevator housing 28 as described hereinafter. Such oxygen comes from two sources. First, some air will unavoidably enter housing structure 12 with the food products being treated which enter through top wall 14 proximate the input end, and such air, having only 60 percent the density of the ozone which is the principal gas within housing structure 12, will float on top of the ozone under the top wall 14, rising with the incline of top wall 14 toward the output end of the apparatus, and thence will float upwardly on top of the ozone through the output elevator housing 28 to its horizontal top section 32 from which it is ejected.

Oxygen is also caused to be present within housing structure 12 because it is the by-product of the oxidation reaction of ozone with potentially toxic organisms on food products conveyed through the apparatus 10. Such oxygen has a density just two-thirds that of ozone. The food products are conveyed longitudinally back and forth through the elongated housing structure 12 on a series of vertically spaced, generally overlapped conveyors, so that this oxygen from the oxidation reaction of the ozone is produced along the top of each of these overlapped conveyors along its entire length. Thus, some of this reaction oxygen will be produced between the topmost conveyor and the top wall 14, and the rest will be produced in the elongated, generally flat spaces between the successive conveyors from the uppermost conveyor to the lowermost conveyor. In order that such reaction oxygen be assured of flowing toward the output end of the apparatus 10, each of the overlapped conveyors is arranged parallel to the general longitudinal axis of the elongated housing structure 12, so that they are each inclined upwardly from the input end to the output end of the housing structure 12 in the same manner as is top wall 14. A sufficient rate of incline to assure the continuous flow of air and oxygen from the input end toward the output end of apparatus 10 and into the upwardly inclined elevator housing 28 for exiting from the apparatus is approximately 2 percent.

The food products to be sterilized are introduced into the apparatus 10 through an input hopper 40 which guides the food products to an input airlock 42 that is preferably of the "revolving door" type, the food products then dropping through an aperture 43 in top wall 14 onto the uppermost conveyor. The input airlock 42 has a vaned rotor 44, the shaft 46 of which may be belt-driven from a gearbox 48 which is in turn belt-driven from a motor 50 as best seen in FIG. 2. The food products thus introduced into the ozone sterilization apparatus 10 may be any food products which it is desirable to sterilize. Typically, these will be vegetable or fruit products which may or may not be dehydrated. By way of example only, and not of limitation, some of the food products the apparatus of the present invention is useful for sterilizing are both raw and dehydrated onions, potatoes, carrots, celery, parsley, cabbage, potato chips, any and all grains such as corn, wheat, milo, soya, barley and rye, a variety of fruits, and even candies. The apparatus of the present invention has particular utility for the sterilization of very delicate food products which, prior to the present invention, could not be effectively sterilized by ozone treatment on a continuous process basis. These include such delicate food products as potato chips, dehydrated onions, some of the more delicate leafy vegetables such as parsley, and delicate fruits such as grapes.

Ozone treatment of some food products according to the present invention can be for a purpose other than sterilization. Thus, while ozone treatment of raw onions does increase storage life by killing all the mold which almost inevitably gets on them from the soil, the ozone treatment also inhibits the onions from growing green sprouts. Also, ozone treatment will retard the ripening of bananas.

Any number of vertically spaced, longitudinally arranged conveyors may be provided within elongated housing structure 12, the number and length of these conveyors determining the capacity of the system for the desired residency time the food products are to be immersed within ozone. By way of example only, and not of limitation, five of these vertically stacked conveyors 52, 54, 56, 58 and 60 have been shown in the apparatus of FIGS. 1-7, as best seen in FIGS. 5 and 7. The uppermost four of these conveyors, 52, 54, 56 and 58, are all of approximately the same length, while the lowermost conveyor 60 is somewhat longer. All five of these conveyors are preferably of the belt type.

The uppermost or first conveyor 52 has its input end located near the input end wall 22 so that the input end portion of conveyor 52 lies directly beneath the input airlock 42 and aperture 43 to receive the incoming food products. Movement of the first conveyor 52 is directed from the input end toward the output end of the apparatus, or to the right as viewed in FIG. 7. The conveyors 52-60 are successively longitudinally staggered so that the food products will drop off of the output end of one conveyor onto the input end portion of the succeeding conveyor. Thus, the second conveyor 54 is offset toward the output end of the apparatus from the first conveyor 52, or to the right as viewed in FIG. 7, and the second conveyor 54 moves from the output end toward the input end of the apparatus, or to the left as viewed in FIG. 7. The third conveyor 56 is longitudinally offset from the second conveyor 54 toward the input end of the apparatus, or to the left as viewed in FIG. 7, to receive food products coming off of second conveyor 54, and third conveyor 56 moves from the input end toward the output end of the apparatus, or to the right as viewed in FIG. 7. Fourth conveyor 58 is longitudinally offset from third conveyor 56 toward the output end of the apparatus, or to the right as viewed in FIG. 7, and it moves in the direction from the output end toward the input end of the apparatus, or to the left as seen in FIG. 7. Finally, the fifth or bottom conveyor 60 is longitudinally offset from fourth conveyor 58 toward the input end of the apparatus, or to the left as seen in FIG. 7, to receive food products coming off of fourth conveyor 58, and it moves toward the output end of the apparatus, or to the right as seen in FIG. 7. With this arrangement, the food products will move through the apparatus 10 of the invention almost five times the length of the elongated housing structure 12 before coming off the output or right-hand end of bottom conveyor 60.

Substantially 100 percent sterilization of dehydrated vegetable products has been found to occur with a residency time of such products in the ozone within elongated housing structure 12 of approximately 14 minutes. Accordingly, the drive mechanism for the conveyors 52-60 is preferably arranged to provide such residency time, or other residency time if so desired. One suitable form of drive mechanism for synchronously driving all of the conveyors 52-60 at the required speed for the selected residency time is a chain drive system generally designated 72 best seen in FIGS. 5 and 6 which drives sprockets on the axles 62, 64, 66, 68 and 70 for the input end rollers of the respective conveyors 52, 54, 56, 58 and 60.

Figure 1:
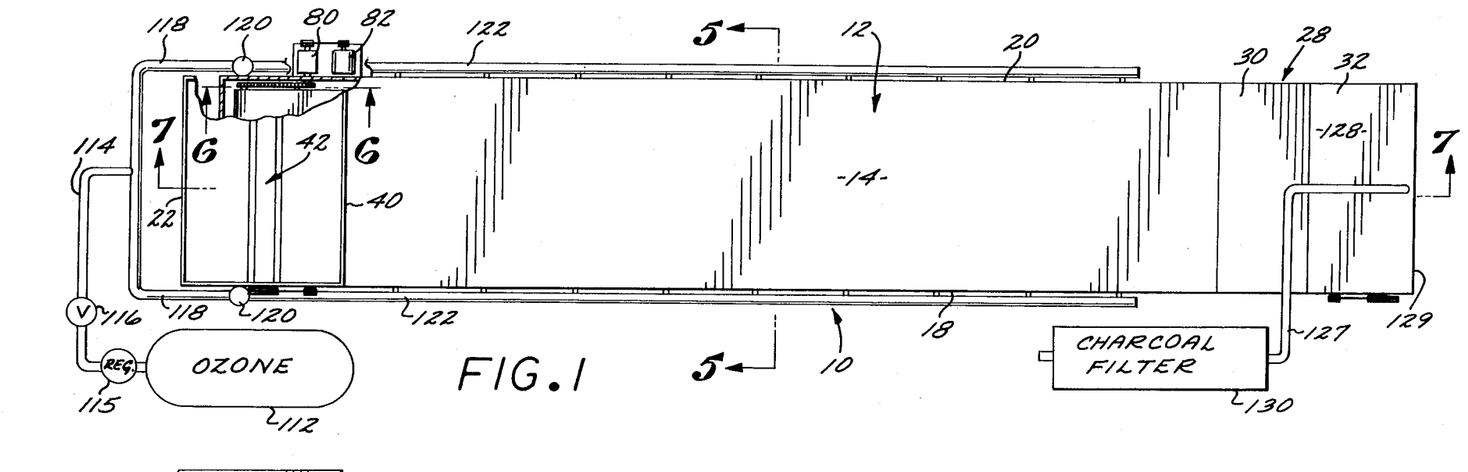
FIG. 1 is a top plan view, with a portion broken away, illustrating the apparatus of a first form of the present invention.

The chain drive system 72 utilizes a single chain loop 74 driven by a drive sprocket 76 on a shaft 78 which is the output shaft of a gearbox 80 that is belt-driven by a motor 82 as seen in FIGS. 1 and 5. The chain loop 74 drives sprockets 84, 86, 88, 90 and 92 on the respective axles 62, 64, 66, 68 and 70, and the chain loop 74 is so arranged and guided by idler sprockets 94 and 96 as to enable the driven sprockets 84-92 to be directly coupled through their respective axles 62-70 to the input end rollers of the respective conveyors 52-60 in their staggered locations as seen in FIG. 7, driving each of the sprockets 84-92 in the correct direction for its respective conveyor. Thus, as viewed in FIG. 6, the chain loop 74 is driven generally in a clockwise direction by drive sprocket 76, which causes the driven sprocket 84 for the upper or first conveyor 52 to be driven clockwise, the sprocket 86 for second conveyor 54 to be driven counterclockwise, the sprocket 88 for third conveyor 56 to be driven clockwise, the sprocket 90 for fourth conveyor 58 to be driven counterclockwise, and the sprocket 92 for the fifth or lowermost conveyor 60 to be driven clockwise.

The sterilized food products are discharged from the output end of the lowermost conveyor 60 onto the lower end portion of elevator conveyor 98 which extends upwardly from a location below conveyor 60 at an incline adjacent the output end wall 24 and above the elongated housing structure 12 through elevator housing 28, the elevator 98 terminating at its upper end in a horizontal output section 100 located within the horizontal top section 32 of elevator housing 28. A pair of guide rollers 102 engage the side edges of the underside of conveyor 98 to hold that in position where conveyor 98 bends from its upward incline to its horizontal section 100.

Figure 4:
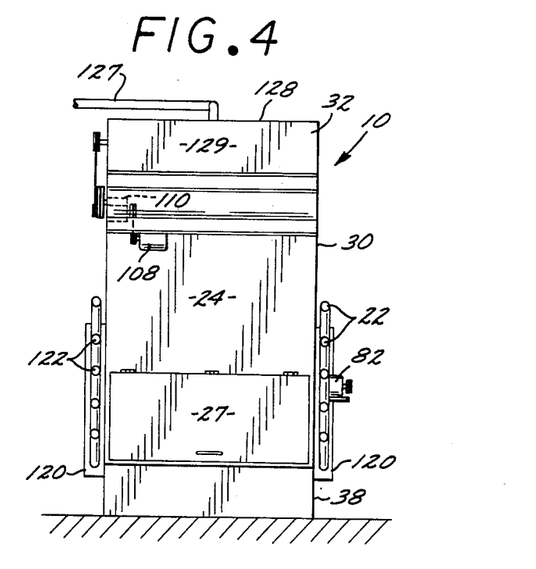
FIG. 4 is an end elevational view of the apparatus of FIGS. 1-3 showing the output end of the apparatus.
Figure 5:
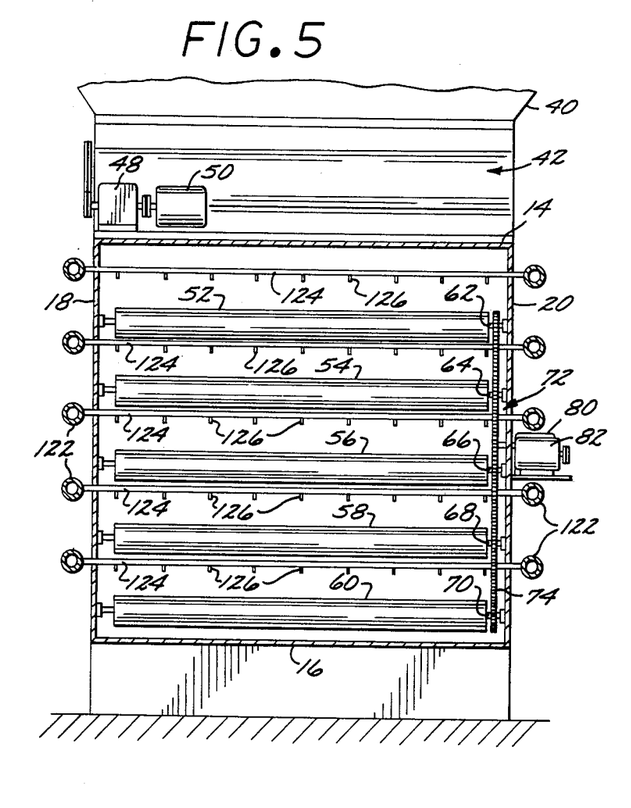
FIG. 5 is a transverse, vertical section taken on the line 5—5 in FIG. 1 showing internal details of construction.
Figure 6:
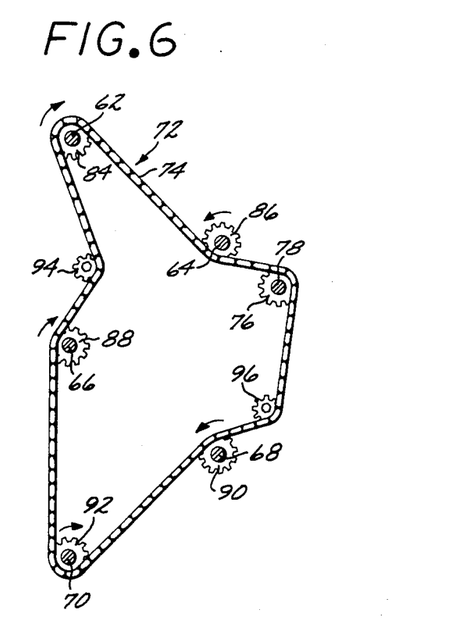
FIG. 6 is a fragmentary vertical section taken on the line 6—6 in FIG. 1 illustrating a chain drive system for driving the series of conveyors upon which the food products being treated are transported through the apparatus of FIGS. 1-5.

The sterilized food products are conveyed from the lower end portion of elevator conveyor 98 upwardly through sections 30 and 32 of elevator conveyor housing 28 and are dropped off of the end of conveyor section 100 into output airlock 104 which has a vaned output rotor 106 belt-driven by a motor 108 through a gearbox 110 as seen in FIGS. 2 and 4. The elevator conveyor 98 may also be belt-driven at its upper end by the motor 108 and gearbox 110 as seen in FIGS. 2 and 4. Alternatively, the elevator conveyor 98 may be driven at its lower end by a chain, gear or belt connection (not shown) to the output end of the lowermost conveyor 60. Output airlock 104 has its entrance 105 in the bottom of elevator conveyor housing top section 32.

The ozone supply and distribution system will now be described. An ozone source of supply is operatively connected to the sterilization apparatus 10, and may be in the form of a pressure cylinder 112 as illustrated in FIG. 1. Ozone leaves the cylinder 112 through a supply conduit 114 having a pressure regulator 115 and control valve 116 therein. The pressure regulator 115 is preferably adjusted to provide a slight positive pressure within the sterilization apparatus 10, as for example approximately 1 psig, so as to provide a small, continuous inflow of ozone into the apparatus 10 for continuously replacing the ozone digested or neutralized to oxygen during oxidation of potentially toxic entities such as bacteria, virus or mold.

The supply conduit 114 from ozone source 112 divides into a pair of delivery conduits 118 which connect with a pair of respective generally upright headers 120 at opposite sides of the apparatus. Each of the headers 120 connects with five longitudinally arranged manifold pipes 122 that extend along the respective sides of the apparatus. Extending between each pair of manifold pipes 122 at the same level is a series of transversely arranged, horizontal, longitudinally spaced distribution tubes 124 located over a respective one of the conveyors 52-60, as best illustrated in FIGS. 5 and 7. Each of these distribution tubes 124 has a series of downwardly directed outlet ports 126 spaced along its length as seen in FIG. 5. The distribution tubes 124 are small diameter tubes, as for example one-quarter inch OD, and by supplying such narrow tubes with ozone from manifold pipes 122 at both ends of the tubes 124, a generally uniform distribution of ozone will be released through the outlet ports 126 across the entire width of each of the conveyors 52-60. By having a separate array of the ozone distribution tubes 124 above each of the conveyors 52-60 spaced along substantially the entire length of each of the conveyors 52-60, a continuous fresh supply of ozone will be available to the food products being sterilized along the entire length of their travel through the sterilization apparatus 10.

An outlet conduit 127 opens upwardly through the top wall 128 of horizontal top section 32 of elevator housing 28 adjacent the output end wall 129 of housing section 32 for discharging air and oxygen from the apparatus 10 which is either unavoidably introduced into the apparatus 10 with the food products through the input airlock 42, or is the spent product of ozone which has reacted with potentially toxic agents such as bacteria, virus or mold on the food products sterilized within the apparatus 10. Some air and oxygen will also be discharged through the output airlock 104. Also, a small amount of unspent ozone will leave apparatus 10 through the outflow conduit 127 and output airlock 104, as the pressure regular 115 will normally be set to a slightly higher pressure than is necessary to furnish the exact correct amount of ozone for 100 percent sterilization of the food products passing through the apparatus 10. Such unspent ozone leaving the apparatus 10 through outflow conduit 127 may be neutralized by being passed through an activated charcoal filter 130, or alternatively it may go to ozone recovery apparatus (not shown).

An important aspect of the present invention is placement of the entrance 105 to outlet airlock 104 and spent gas outflow conduit 127 at locations substantially elevated above the main body of elongated housing structure 12, i.e., above the top wall 14 of housing structure 12. Also of importance is placement of the input airlock 42 above the elongated housing structure 12 and having the actual inlet into the housing structure 12 through the aperture 43 in its top wall 14. Cooperating with such elevated placements of the outlets and inlet is the upward incline of both the top wall 14 of housing structure 12 and each of the series of elongated conveyors 52–60. All of these factors cooperate in the following manner to preferentially remove air unavoidably entering the elongated housing structure 12 through input airlock 42 and oxygen which is the spent product from oxidation of potentially toxic organisms during the sterilization process, so as to maximize the concentration of ozone applied to the food products during their travel through the apparatus 10 and to minimize loss of ozone from the system. First, by placing the input airlock 42 above the top wall 14 and having the input of food products through the aperture 43 in top wall 14, air which unavoidably enters with the incoming food products will float upon the body of ozone which fills the chamber defined within elongated housing structure 12 because of its much lower density than the ozone, and this floating action will cause the incoming air to flow up the ramp provided by the continuous incline of top wall 14 from the input end to the output end of the elongated housing structure 12. Similarly, oxygen which is a by-product of the oxidizing action of ozone on potentially toxic organisms will float upwardly though the body of ozone from the locations where it is generated along the lengths of the conveyors 52–60. Oxygen by-product that is thus generated on the uppermost conveyor 52 will rise directly toward the underside of top wall 14 and flow toward the output end of housing structure 12 along with air admitted through the input airlock 42. Oxygen generated on each of the other four conveyors 54–60 will rise to the underside of the conveyor immediately above the one upon which it was generated, and will then flow around the sides of that next higher conveyor and past the sides of other conveyors above it toward the underside of top wall 14, or will flow up the longitudinal incline of the underside of the conveyor above that upon which it was generated, to the output end. All of such air and oxygen will then arrive at the output end of elongated housing structure 12 and will float above the ozone upwardly through the upwardly inclined section 30 of elevator housing 28 into the horizontal top section of housing 28, and part of this air and oxygen will be pumped out of the system by the vaned output rotor 106, while the remainder of this air and oxygen will be removed from the system through outflow conduit 127.

Thus, the elongated housing structure 12 is a primary housing structure which defines an ozone treatment zone, while the elevator conveyor housing 28 may be considered to be a secondary housing structure defining a gravity separation zone in which air and oxygen are separated from the body of ozone in the primary housing structure and from which the air and oxygen are removed from the system.

Figure 8:
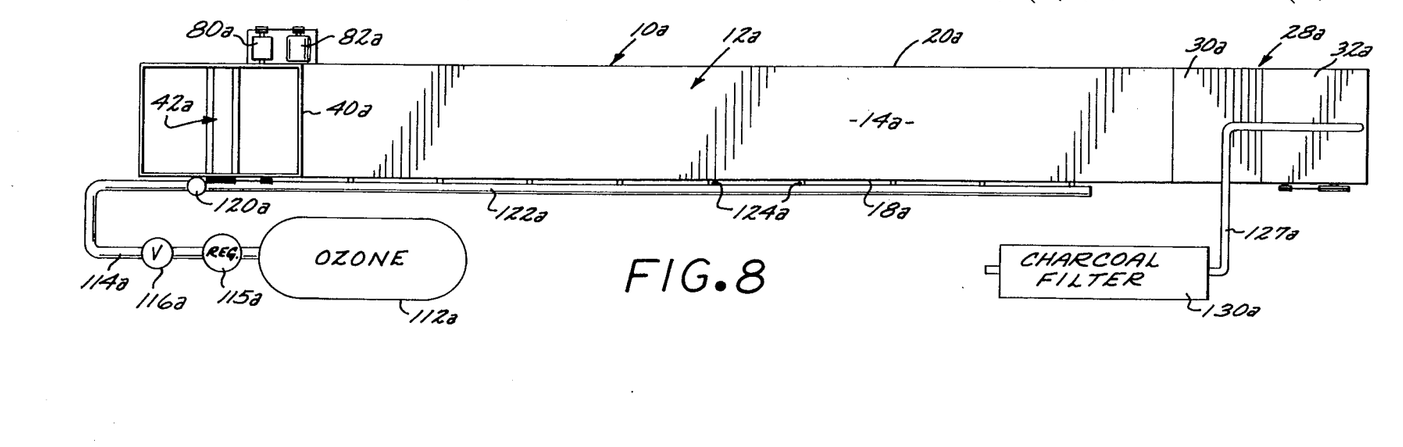
FIG. 8 is a top plan view of a second form of the invention which is narrower in width than the first form of FIGS. 1-7.
Figure 9:
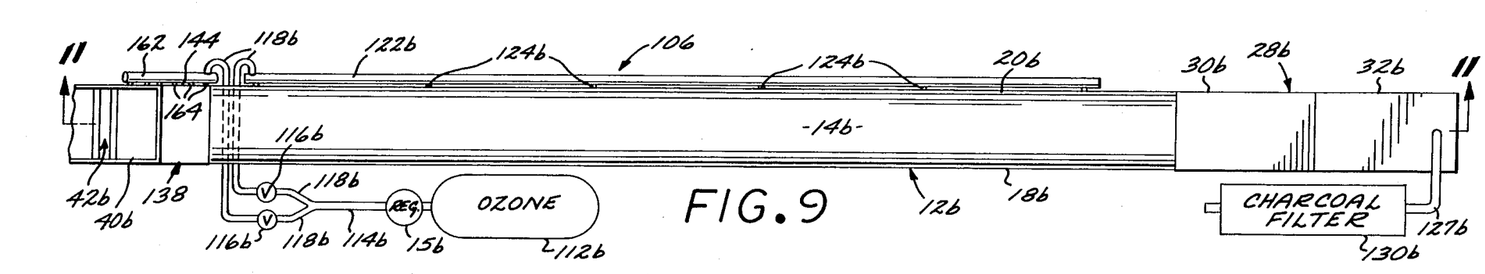
FIG. 9 is a top plan view of a third form of the invention which is arranged to tumble food products through an ozone environment.
Figure 10:
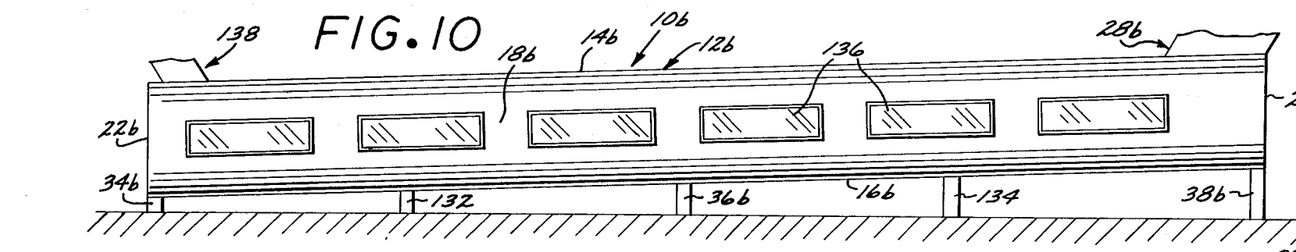
FIG. 10 is a fragmentary side elevational view of the apparatus shown in FIG. 9.

FIG. 8 is a top plan view of a second form of ozone sterilization apparatus according to the invention designated 10a. Apparatus 10a differs from apparatus 10 of FIGS. 1–7 in that it is considerably narrower between its side walls 18a and 20a, and because of this the ozone delivery system is fed from only one side of the apparatus. Apparatus 10a has elongated housing structure 12a which opens at its output end into elevator conveyor housing 28a having upwardly inclined section 30a terminating at its upper end in horizontal top section 32a. At the input end of apparatus 10a, food products to be sterilized are introduced from the top through input hopper 40a having associated input airlock 42a. A series of overlapped conveyors similar to those shown in FIG. 7 is driven by motor 82a through gearbox 80a. Ozone source 112a, which may be a pressure cylinder, is fed through supply conduit 114a having pressure regulator 115a and control valve 116a therein to a single header 120a adjacent side 118a of housing structure 12a. Manifold pipes 122a along side 18a feed the transverse distribution tubes 124a that are arranged above each of the overlapped conveyors within elongated housing structure 12a. Gas outflow conduit 127a for removal of oxygen and overflow ozone leads from horizontal top section 32a of elevator conveyor housing 28a to activated charcoal filter 130a, or alternatively to ozone recovery apparatus (not shown).

A third form of the invention is illustrated in FIGS. 9–12 and differs from the other forms principally in the arrangement of the conveyors in its elongated housing structure, and also in its input structure. This third form of ozone sterilization apparatus according to the invention is generally designated 10b, and has an elongated housing structure 12b which will generally be longer than the housing structures 12 and 12a of the other two illustrated forms of the invention for the capacity of the system.

Figures 11, 12:
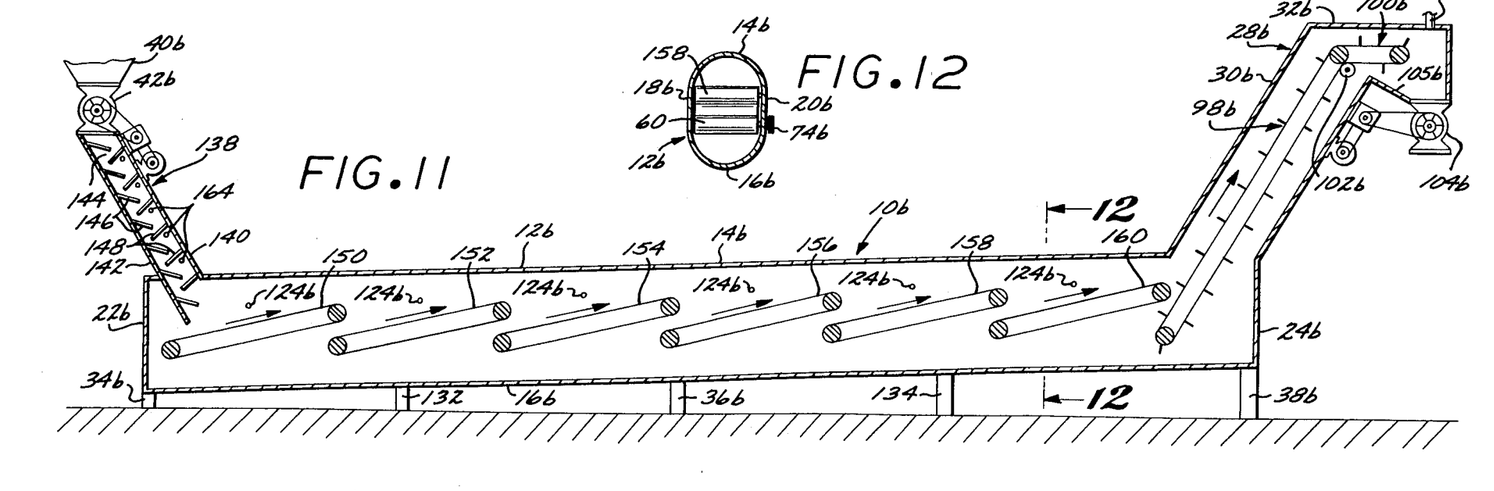
FIG. 11 is a longitudinal, vertical section taken on the line 11—11 in FIG. 9 showing internal details of construction of the apparatus of FIGS. 9 and 10.
FIG. 12 is a transverse vertical section taken on the line 12—12 in FIG. 11.

Elongated housing structure 12b has top and bottom walls 14b and 16b, respectively, which in this form of the invention are arcuate in cross-section as seen in FIG. 12, and has side walls 18b and 20b. Side wall 18b has a longitudinally arranged series of observation windows 136 therein. The input and output ends of housing structure 12b are defined respectively by end walls 22b and 24b. Housing structure 12b inclines upwardly from its input end to its output end, preferably with an incline of approximately two percent, for the same reason that the housing structure 12 inclines in the form of the invention shown in FIGS. 1–7. This incline of elongated housing structure 12b is provided by a series of supports upon which housing structure 12b is mounted that successively increase in height from the input end to the output end, these being support 34b at the input end, intermediate supports 132, 36b and 134, and support 38b at the output end. The five supports instead of three as in the form of FIGS. 1–7 are provided because of the extra length of the housing structure 12b.

Housing structure 12b communicates at its output end with elevator conveyor housing 28b having upwardly inclined section 30b that terminates at its upper end in horizontal top section 32b.

At the input end of apparatus 10b, the input hopper 40b is mounted on the upper end of an elongated input chute 138 that inclines downwardly and forwardly from input hopper 40b to the top wall 14b to which the lower end portion of chute 138 is connected. Input airlock 42b is arranged between input hopper 40b and the top of input chute 138. Input chute 138 has elongated, inclined front and rear walls 140 and 142, respectively, and side walls 144. A series of regularly spaced deflector baffles 146 extend forwardly and downwardly from rear wall 142, and a series of regularly spaced deflector baffles 148 extend rearwardly and downwardly from front wall 140. The baffles 146 and 148 are arranged in alternating sequence so that food products passing downwardly and forwardly through input chute 138 are tumbled back and forth in an ozone environment within chute 138.

A series of inclined, overlapping conveyors 150, 152, 154, 156, 158 and 160 is arranged longitudinally along substantially the entire length of the elongated housing structure 12b, the conveyors 150-160 all being generally centered between the top and bottom walls 14b and 16b of housing structure 12b. All of the overlapping conveyors 150-160 are moving in the same direction, from the input end toward the output end of the housing structure 12b, and each of the conveyors 150-160 inclines upwardly from its input end to its output end. This longitudinal array of inclined, overlapping conveyors provides a series of tumbling actions to the food products as they are conveyed longitudinally through the length of the housing structure 12b, the food products being tumbled each time they drop off the output or discharge end of one of the conveyors 150-158 onto the input end portion of the next conveyor 152-160 in succession. Then the food products tumble off the output or discharge end of the final conveyor 160 onto elevator conveyor 98b which inclines upwardly through the inclined section 30b of conveyor housing 28b and terminates in horizontal output section 100b within top section 32b of conveyor housing 28b. A pair of guide rollers 102b engages the side edges of the underside of conveyor 98b where it bends from its upward incline to its horizontal section 100b.

The food products sterilized by ozone treatment as they have dropped down through the elongated input chute 138 and have been conveyed by the successive inclined, overlapping conveyors 150-160 are deposited from conveyor 160 onto to the elevator conveyor 98b and conveyed thereby to the top section 32b of elevator housing 28b and dropped off of the horizontal output section 100b of conveyor 98b into output airlock 104b. The bottom wall 105b of the top section 32b of the elevator housing inclines downwardly toward the output airlock 104b to guide the sterilized food products into airlock 104b.

The ozone system for sterilization apparatus 10b includes ozone source of supply 112b, which may be a pressure cylinder as illustrated. Ozone from source 112b passes through supply conduit 114b having pressure regulator 115b therein, and then divides into a pair of delivery conduits 118b, each of which has a control valve 116b therein. One of the delivery conduits 118b is connected to the input end of a single, long manifold pipe 122b which extends along side wall 22b for most of the length of elongated housing structure 12b. A series of horizontal, transversely arranged distribution tubes 124b are supplied with ozone from the single manifold pipe 122b, at least one of such distribution tubes 124b being disposed above each of the conveyors 150-160 for distributing ozone proximate the respective conveyors. The transverse distribution tubes 124b are of the same type shown and described in connection with the form of the invention illustrated in FIGS. 1-7, but are only supplied with ozone from one side because of the narrowness of housing structure 12b.

The other delivery conduit 118b is connected to a short manifold 162 extending upwardly along a side wall 144 of input chute 138. Manifold pipe 162 furnishes ozone to a series of transverse, horizontal ozone distribution tubes 164 which fill the chute 138 with ozone to provide an initial application of ozone to the food products as they tumble back and forth between the alternating deflector baffles 146 and 148. Thus, two types of tumbling action are applied to the food products during the ozone treatment, one being the tumbling between deflector baffles 146 and 148 in input chute 138 while ozone is applied, and the other being tumbling off of the output ends of the conveyors 150-160.

An outflow conduit 128b for air, oxygen, and a small amount of overflow ozone extends through the top wall of top section 32b of elevator conveyor housing 28b, and leads to an activated charcoal filter 130b, or alternatively to ozone recovery apparatus (not shown).

The third form of the present invention which is shown in FIGS. 9-12 is directed primarily to the ozone treatment of such food products as grain which are in small particulate form and are relatively dense so as to tend to pack together, and also which are not fragile and are able to withstand the tumbling action without any likelihood of trauma. The series of tumbling actions as the food product passes down through the chute 138 and from conveyor to conveyor breaks the packed material apart so as to assure thorough application of ozone to the individual particles.

To illustrate the effectiveness of the ozone sterilization apparatus and method of the present invention, applicant conducted ozone sterilization tests on dehydrated onions, which had an initial bacterial count of 2400 parts (bacteria units) per gram of product. With five minutes of exposure to substantially 100 percent ozone, the bacterial count went down to approximately 70 parts per gram. With ten minutes of such exposure, the bacterial count was zero. It is applicant's understanding that a bacterial count of 30 parts per gram in dehydrated food products is acceptable to the U.S. Department of Agriculture. A principal objective of the present invention is to provide a sterilization atmosphere as close as possible to 100 percent ozone, and by transporting the food products along a series of conveyors with a properly adjusted speed to provide a residency time such that the bacterial count of the sterilized food products will approach zero. Of course, a 100 percent ozone atmosphere is not possible because of the continuous breakdown of ozone into oxygen as potentially toxic organisms are oxidized. Nevertheless, the overall biomass of such potentially toxic organisms, which are microscopic, is so small relative to the volume of food products being processed and the overall volume within the apparatus that the oxygen generated by breakdown of ozone is only a very small fraction of the body of ozone within the apparatus, so the concentration of ozone within the apparatus actually can be brought close to 100 percent. As described hereinabove in detail, important factors in approaching a 100 percent concentration of ozone in the apparatus are (1) entrance of the food products proximate the top of the elongated housing structure, and preferably through the top wall thereof, so that air unavoidably entering the apparatus will enter proximate the top of the apparatus; (2) inclining at least the top wall of the elongated housing structure of the apparatus upwardly from the input end to the output end so that such inflowing air and oxygen which is the by-product of the action of ozone on microorganisms will flow continually to the output end of the apparatus; and (3) having the sterilized product outlet and gas outlet raised substantially above the level of the elongated housing structure in which the sterilization treatment is accomplished, so that air and oxygen will float upwardly toward the outlets on the much heavier ozone and will be discharged preferentially over ozone.

Applicant's bacteria count tests showing a 100 percent bacteria kill in dehydrated onions with ten minutes of exposure to substantially 100 percent ozone indicate that a preferred residency time of approximately 14 minutes in applicant's apparatus will produce a substantially 100 percent bacteria kill, even though there may be small amounts of air and oxygen in the apparatus, and that a preferred minimum residency time of at least approximately ten minutes will suffice to reduce the bacterial count to less than that which is acceptable to the U.S. Department of Agriculture.

While the present invention has been described with reference to presently preferred embodiments, it is to be understood that various modifications or alterations may be made by those skilled in the art without departing from the scope and spirit of the invention as set forth in the appended claims.

I claim:

1. Apparatus for the continuous process treatment of food products with ozone gas, which comprises:
    substantially closed primary housing structure defining an ozone treatment zone;
    a source of supply of a treatment gas comprising ozone that is substantially more dense than oxygen connected to said primary housing structure for substantially completely filling said treatment zone with said treatment gas;
    conveyor means in said treatment zone for continuously conveying said food products through said treatment zone so as to subject said food products to said treatment gas, said conveyor means having input and output end portions;
    input means connected to said primary housing structure through which said food products are introduced into said primary housing structure and onto said input end portion of said conveyor means;
    output means connected to said primary housing structure for transporting treated food products from said output end portion of said conveyor means and out of the apparatus; and
    means for continuously removing oxygen that is a by-product of the product treatment from said treatment zone, said removing means comprising secondary housing structure connected to said primary housing structure and defining a gravity separation zone located above and in communication with said treatment zone and into which said by-product oxygen rises by floating above the more dense treatment gas.

2. Apparatus as defined in claim 1, wherein said output means comprises output passage means in said secondary housing structure and located above said treatment zone so as to minimize loss of ozone through said output passage means.

3. Apparatus as defined in claim 2, wherein said output passage means comprises an output airlock.

4. Apparatus as defined in claim 3, wherein said output airlock is of the revolving door type.

5. Apparatus as defined in claim 2, wherein said output means comprises elevator conveyor means for transporting the treated said food products from said output end portion of said treatment zone conveyor means to said output passage means.

6. Apparatus as defined in claim 1, wherein at least a portion of said by-product oxygen is conducted out of said gravity separation zone through said output passage means.

7. Apparatus as defined in claim 1, which comprises outlfow conduit means connected to said secondary housing structure and communicating with said gravity separation zone proximate the top thereof for removing at least a portion of said by-product oxygen from the apparatus.

8. Apparatus as defined in claim 1, wherein said input means is located proximate the top of said primary housing structure so that air unavoidably entering said primary housing structure with the incoming said food products will be introduced proximate the top of said ozone treatment zone and mixing of such air with said treatment gas will thereby be minimized because such air will tend to float on top of the more dense treatment gas.

9. Apparatus as defined in claim 8, wherein the top of said ozone treatment zone is inclined upwardly from said input means to said gravity separation zone, whereby such incoming air will float upwardly along said top of said ozone treatment zone from said input means to said gravity separation zone where it will join said by-product oxygen.

10. Apparatus as defined in claim 1, wherein said conveyor means comprises a series of vertically stacked elongated conveyor units that are vertically spaced, substantially parallel and generally horizontal, successive ones of said conveyor units moving in opposite directions, the uppermost of said conveyor units having an input end located under said input means, and the lower most of said conveyor units having an output end operatively associated with said output means for delivering treated said food products to said output means;
    each of said conveyor units below said uppermost unit having an input end portion that extends horizontally outwardly beyond the output end of the conveyor unit above it so as to receive food products dropping off the output end of the conveyor unit above it.

11. Apparatus as defined in claim 10, wherein said series of conveyor units extends generally from the location of said input means toward the location of said gravity separation zone, and at least those of said conveyor units which are above the lowermost said conveyor unit inclining upwardly from the region of said input means toward said gravity separation zone so that said by-product oxygen produced on such conveyor units will tend to float upwardly along the lengths of said conveyor units toward said gravity separation zone.

12. Apparatus as defined in claim 10, wherein said source of supply of treatment gas comprises gas delivery means above each of said conveyor units.

13. Apparatus as defined in claim 12, wherein said source of supply of said treatment gas comprises a series of transverse gas distribution tubes disposed above each of said conveyor units and spaced generally along the lengths of said conveyor units.

14. Apparatus as defined in claim 1, wherein said conveyor means comprises an elongated array of a series of conveyor units all of which are moving in the same direction, each of said conveyor units inclining upwardly from an input end to an output end, with the output end of each conveyor unit except the last one in line overlying the input end of the next succeeding conveyor unit so that food products coming off of each of said conveyor units except the final one in line will tumble onto the next succeeding conveyor unit, the first said conveyor unit in line having its input end portion located below said input means to receive incoming said food products, and the last said conveyor unit in line being operatively associated with said output means so as to deliver treated said food products to said output means.

15. Apparatus as defined in claim 14, wherein said source of supply of treatment gas comprises gas delivery means above each of said conveyor units.

16. Apparatus as defined in claim 14, wherein said input means comprises an input chute having a series of deflector baffles therein which deflect the incoming food products back and forth so that they tumble down through said chute, said source of supply of treatment gas comprising gas delivery means connected to said chute so as to deliver treatment gas into said chute for application thereof to the tumbling food products therein.

17. Apparatus as defined in claim 1, wherein said conveyor means is driven at a speed that will give said food products a residency time in said treatment zone of at least approximately ten minutes.

18. Apparatus as defined in claim 1, wherein said conveyor means is driven at a speed that will give said food products a residency time in said treatment zone of approximately fourteen minutes.

* * * * *